(12) United States Patent
Coleman et al.

(10) Patent No.: US 6,884,966 B2
(45) Date of Patent: Apr. 26, 2005

(54) METHOD AND APPARATUS FOR FORMING AND HEAT TREATING STRUCTURAL ASSEMBLIES

(75) Inventors: Gary W. Coleman, Snohomish, WA (US); John R. Fischer, Winthrop, WA (US); Marc R. Matsen, Seattle, WA (US); Elizabeth M. Mull, Seattle, WA (US); David S. Nansen, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 26 days.

(21) Appl. No.: 10/277,903

(22) Filed: Oct. 22, 2002

(65) Prior Publication Data

US 2004/0074889 A1 Apr. 22, 2004

(51) Int. Cl.[7] .................................................. H05K 1/00
(52) U.S. Cl. ........................ 219/243; 148/698; 266/114
(58) Field of Search ................................. 219/243, 614, 219/633; 228/112.1, 157; 72/69, 60; 148/564, 547, 585, 698, 575, 415; 266/114, 121

(56) References Cited

U.S. PATENT DOCUMENTS

| | | | |
|---|---|---|---|
| 3,753,798 A | | 8/1973 | Komatsu et al. |
| 4,142,923 A | | 3/1979 | Satava |
| 4,394,194 A | * | 7/1983 | Satava et al. ................ 148/575 |
| 4,599,502 A | * | 7/1986 | Khare et al. ................ 219/614 |
| 4,658,362 A | | 4/1987 | Bhatt |
| 4,713,953 A | | 12/1987 | Yavari |
| 4,811,890 A | | 3/1989 | Dowling et al. |
| 4,820,355 A | | 4/1989 | Bampton |
| 4,861,391 A | * | 8/1989 | Rioja et al. ................ 148/564 |
| 4,956,008 A | | 9/1990 | McQuilkin |
| 5,025,974 A | | 6/1991 | Strickland |
| 5,115,963 A | | 5/1992 | Yasui |

(Continued)

Primary Examiner—Henry Bennett
Assistant Examiner—Leonid M Fastovsky
(74) Attorney, Agent, or Firm—Alston & Bird LLP

(57) ABSTRACT

There are provided an apparatus and an associated method for manufacturing superplastically formed structural assemblies from preforms. The apparatus includes first and second co-operable dies structured to define a die cavity therebetween for at least partially receiving the preform, at least one heater in thermal communication with the die cavity for heating the preform to a forming temperature, and at least one injector in fluid communication with the die cavity. The injector is structured for injecting pressurized gas into the die cavity to urge the preform against one of the dies to form the preform into the structural assembly. Further, at least one of the injectors is structured for injecting a quenchant into the die cavity to thereby heat treat the structural assembly while distortion of the structural assembly is being at least partially restrained by at least one of the dies.

13 Claims, 13 Drawing Sheets

U.S. PATENT DOCUMENTS

| | | | |
|---|---|---|---|
| 5,181,969 A | | 1/1993 | Komatsubara et al. |
| 5,263,638 A | * | 11/1993 | Douglas ..................... 228/118 |
| 5,277,045 A | | 1/1994 | Mahoney et al. |
| 5,289,965 A | | 3/1994 | Yasui et al. |
| 5,309,747 A | | 5/1994 | Yasui |
| 5,410,132 A | | 4/1995 | Gregg et al. |
| 5,419,170 A | | 5/1995 | Sanders et al. |
| 5,419,791 A | * | 5/1995 | Folmer ....................... 148/585 |
| 5,420,400 A | | 5/1995 | Matsen |
| 5,467,626 A | * | 11/1995 | Sanders ......................... 72/60 |
| 5,530,227 A | | 6/1996 | Matsen et al. |
| 5,556,565 A | * | 9/1996 | Kirkwood et al. .......... 219/633 |
| 5,603,449 A | | 2/1997 | Mansbridge et al. |
| 5,638,724 A | | 6/1997 | Sanders |
| 5,645,744 A | | 7/1997 | Matsen et al. |
| 5,661,992 A | | 9/1997 | Sanders |
| 5,683,607 A | | 11/1997 | Gillespie et al. |
| 5,683,608 A | | 11/1997 | Matsen et al. |
| 5,700,995 A | | 12/1997 | Matsen |
| 5,705,794 A | | 1/1998 | Gillespie et al. |
| 5,728,309 A | | 3/1998 | Matsen et al. |
| 5,737,954 A | | 4/1998 | Yasui |
| 5,808,281 A | | 9/1998 | Matsen et al. |
| 5,823,032 A | | 10/1998 | Fischer |
| 5,829,716 A | * | 11/1998 | Kirkwood et al. ...... 244/117 R |
| 5,914,064 A | | 6/1999 | Gillespie et al. |
| 6,129,261 A | * | 10/2000 | Sanders ....................... 228/157 |
| 6,264,767 B1 | * | 7/2001 | Frank et al. ................. 148/547 |
| 6,299,706 B1 | * | 10/2001 | Miyake et al. .............. 148/415 |
| 6,322,645 B1 | | 11/2001 | Dykstra et al. |
| 6,337,471 B1 | * | 1/2002 | Kistner et al. .............. 219/633 |
| 6,568,582 B1 | * | 5/2003 | Colligan .................. 228/112.1 |
| 6,659,331 B1 | * | 12/2003 | Thach et al. ............. 228/112.1 |
| 2002/0139161 A1 | * | 10/2002 | Gates ........................... 72/69 |
| 2003/0218052 A2 | * | 11/2003 | Litwinski ................. 228/112.1 |

\* cited by examiner

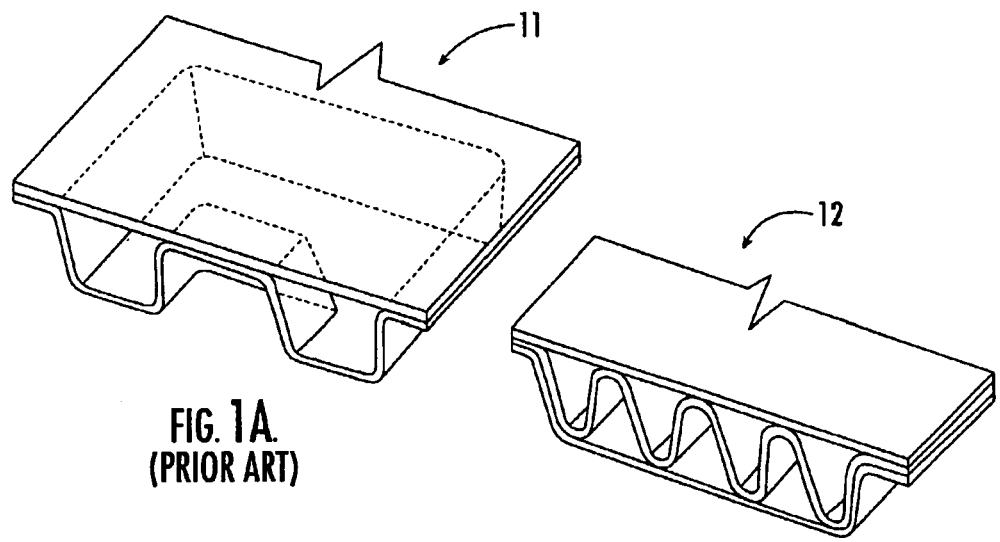
FIG. 1A.
(PRIOR ART)
FIG. 1B.
(PRIOR ART)
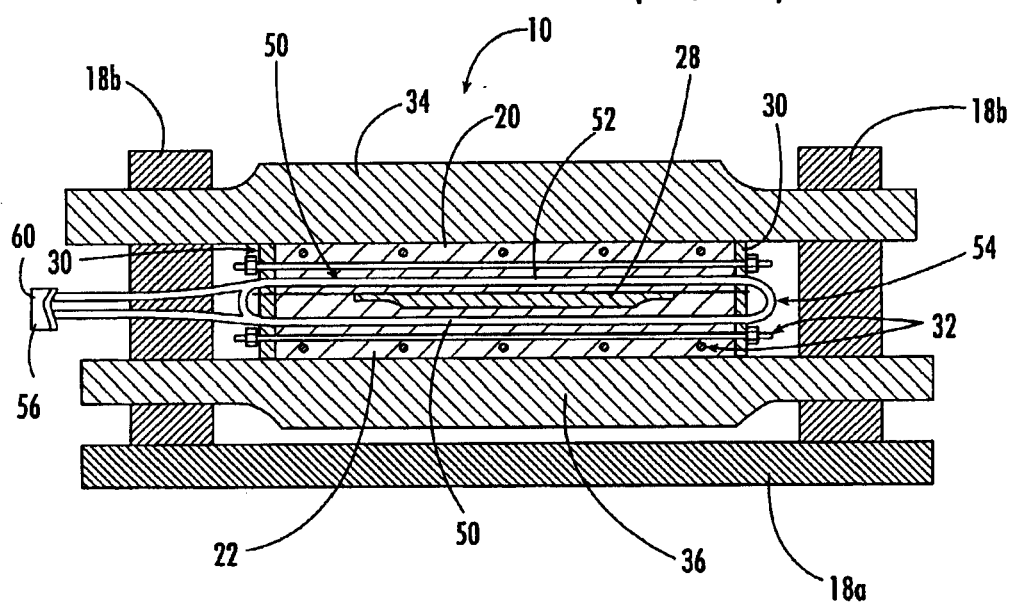
FIG. 2A.

METHOD AND APPARATUS FOR FORMING AND HEAT TREATING STRUCTURAL ASSEMBLIES

BACKGROUND OF THE INVENTION

1. Field of the Invention

The present invention relates to structural assemblies and, more particularly, relates to an apparatus and associated method for forming and heating treating structural assemblies.

2. Description of Related Art

Superplastic forming ("SPF") is a process used to form structural assemblies having complex three-dimensional shapes, such as the two- and three-sheet assemblies 11, 12 illustrated in FIGS. 1A and 1B, respectively. These assemblies are formed from plastics, metals and metal alloys, including aluminum, titanium, and alloys thereof, that exhibit superplastic behavior at certain temperatures, i.e., large elongations (up to 2,000 percent).

During the SPF process, an "SPF pack" (also referred to herein as a "preform") is formed of a single sheet or two or more stacked sheets of material. The SPF pack is placed into a shaping die and heated to a sufficiently high temperature within the superplasticity range of the material to soften the sheet or sheets of material. Pressurized heated gas is then injected against and/or into the SPF pack, causing the pack to inflate and fill the die, thereby forming a structural assembly Once inflated, the portions of any sheets of material that are in contact with an adjacent sheet of material will join through brazing or diffusion bonding. The structural assembly is then cooled and removed from the die and final machining steps are performed, such as edge trimming, to form the finished structural assembly. Advantageously, the SPF process can be used to form structural assemblies that can satisfy narrow shape and tolerance requirements without substantial additional machining. Such combined cycles for forming are described in U.S. Pat. No. 5,410,132 entitled "Superplastic Forming Using Induction Heating," which issued on Apr. 25, 1995; U.S. Pat. No. 5,420,400 entitled "Combined Inductive Heating Cycle for Sequential Forming the Brazing," which issued on May 30, 1995; U.S. Pat. No. 5,700,995 entitled "Superplastically Formed Part," which issued on Dec. 23, 1997; U.S. Pat. No. 5,705,794 entitled "Combined Heating Cycles to Improve Efficiency in Inductive Heating Operations," which issued on Jan. 6, 1998; U.S. Pat. No. 5,914,064 entitled "Combined Cycle for Forming and Annealing" which issued on Jun. 22, 1999; and U.S. Pat. No. 6,337,471 entitled "Combined Superplastic Forming and Adhesive Bonding" which issued on Jan. 8, 2002, each of which is assigned to the assignee of the present invention and is incorporated herein by reference.

For some materials, the high temperatures of the SPF process reduce the material properties, such as strength, toughness, and corrosion resistance, of the material. Thus, a subsequent heat treating process may be required after the structural assembly has been superplastically formed in order to restore these material properties. For example, structural assemblies formed of aluminum alloys often require heat treatment, such as quenching, after superplastic forming to restore the strength and toughness of the material. Undesirably, temperature gradients in the structural assembly during the heat treating process can result in shape and dimensional distortion of the assembly, which can require further machining and/or forming operations to bring the assembly back into compliance with the required shape and dimensional tolerances. These additional machining and forming operations can be time and labor intensive, which can adversely affect the overall cost of the finished assembly.

Thus, there exists a need for an apparatus and associated method for producing complex structural assemblies that exhibit high material properties, including high strength, toughness, and corrosion resistance, and that can consistently satisfy narrow shape and dimensional tolerances, as are typically required in the aerospace and automotive industries. The apparatus must be cost effective, and should be easily adaptable to variations in the configurations of the structural assembly.

SUMMARY OF THE INVENTION

The present invention provides an apparatus for forming a structural assembly from at least one preform. The apparatus includes first and second co-operable dies structured to define a die cavity therebetween for at least partially receiving the at least one preform, at least one heater in thermal communication with said die cavity for heating the at least one preform to a forming temperature, and at least one injector in fluid communication with said die cavity. At least one of the injectors is structured for injecting pressurized gas into the die cavity to urge the at least one preform at least partially against at least one of the first and second dies to thereby form the preform into the structural assembly. Further, at least one of the injectors is structured for injecting a quenchant into the die cavity to thereby heat treat the structural assembly while distortion of the structural assembly is being at least partially restrained by at least one of the dies. According to one embodiment of the invention, each injector includes a tubular member with a plurality of nozzles that are structured to spray the quenchant onto the structural assembly. The apparatus can also include a valve in fluid communication with the die cavity and structured to maintain the pressure within the die cavity below a predetermined pressure, wherein the tubular members define a plurality of apertures in fluid communication with the valve. At least one of the first and second dies can include at least one drain connected to the cavity for conveying fluid from the cavity as a result of gravity or pressure inside the die cavity. The apparatus can also include a sealing frame. The sealing frame has first and second portions attached to the first and second dies, respectively, and structured to at least partially engage the preform to seal the die cavity. Each injector can also be sealably attached to either or both portions of the sealing frame. In another embodiment, the apparatus includes at least one susceptor, and the heater includes an induction coil that is structured to induce an electromagnetic field within at least a portion of the susceptor. The susceptor can have a Curie temperature at which the susceptor becomes paramagnetic, and the Curie temperature can be about equal to the forming temperature of the preform. The dies can include at least one sensor for measuring the temperature and/or pressure inside the die cavity.

The present invention also provides another apparatus for forming a structural assembly from at least one preform. The apparatus includes first and second co-operable dies structured to define a die cavity therebetween for at least partially receiving the at least one preform. At least one of the dies defines a forming surface for shaping the preform into the structural assembly. The apparatus also includes at least one heater in thermal communication with the die cavity for heating the preform to a forming temperature and at least one injector in fluid communication with the die cavity. At least one of the injectors is structured for injecting pressurized gas into the die cavity to pressurize the die cavity and to urge the preform at least partially against the forming surface to form the preform into the structural assembly. Further, at least one of the injectors is structured for injecting a quenching fluid into the die cavity to thereby heat treat the structural assembly while the structural assembly is being urged against the forming surface to thereby reduce distortion of the structural assembly. According to one embodiment of the invention, each injector includes a tubular member with a plurality of nozzles that are structured to spray the quenchant onto the structural assembly. The apparatus can also include a valve in fluid communication with the die cavity and structured to maintain the pressure within the die cavity below a predetermined pressure, wherein the tubular members define a plurality of apertures in fluid communication with the valve. At least one of the first and second dies can define at least one aperture in fluid communication with the die cavity and structured to drain the quenchant therefrom as a result of gravity or pressure inside the die cavity. The apparatus can also include a sealing frame. The sealing frame has first and second portions attached to the first and second dies, respectively, and structured to at least partially engage the preform to seal the die cavity. Each injector can also be sealably attached to the either or both portions of the sealing frame. In another embodiment, the apparatus includes at least one susceptor, and the heater includes an induction coil that is structured to induce an electromagnetic field within at least a portion of the susceptor. The susceptor can have a Curie temperature at which the susceptor becomes paramagnetic, and the Curie temperature can be about equal to the forming temperature of the preform. The dies can include at least one sensor for measuring the temperature and/or pressure inside the die cavity.

The present invention also provides a method of manufacturing a structural assembly and a structural assembly obtained thereby. The method includes providing at least one preform, for example, by at least partially friction stir welding the preform. The preform is positioned between first and second co-operable dies and formed into the structural assembly using at least one of the first and second dies, for example, by heating the preform and injecting pressurized gas to urge the preform at least partially against one or both of the dies. The preform can be heated by energizing an induction coil to induce an electromagnetic field in at least one susceptor, for example, to the Curie temperature of the susceptor. In one embodiment, coolant is circulated through the at least one induction coil. The preform can also be solution heat treated.

According to one aspect, the structural assembly is quenched with a quenchant. Distortion of the structural assembly is reduced by at least partially constraining the structural assembly concurrently with the quenching step using at least one of first and second co-operable dies. In another embodiment, quenching includes injecting the quenchant through a plurality of nozzles of an injector onto the structural assembly. The structural assembly can be cooled by quenching to a second temperature less than about 300° F. and at a rate of at least 100° F. per second.

After forming, and in addition to or instead of quenching, the structural assembly can be aged by heating the structural assembly according to a predetermined temperature schedule within the dies. For example, the structural assembly can be heated by energizing the induction coil to induce an electromagnetic field in the susceptor. Concurrently, the dies can be used to restrain distortion of the structural assembly.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein:

FIG. 1A is a fragmentary perspective view illustrating a two-sheet superplastically formed structural assembly, as is known in the art;

FIG. 1B is a fragmentary perspective view illustrating a three-sheet superplastically formed structural assembly, as is known in the art;

FIG. 2A is an elevation view illustrating the forming apparatus for superplastically forming a structural assembly, according to one embodiment of the present invention;

DETAILED DESCRIPTION OF THE INVENTION

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2B:
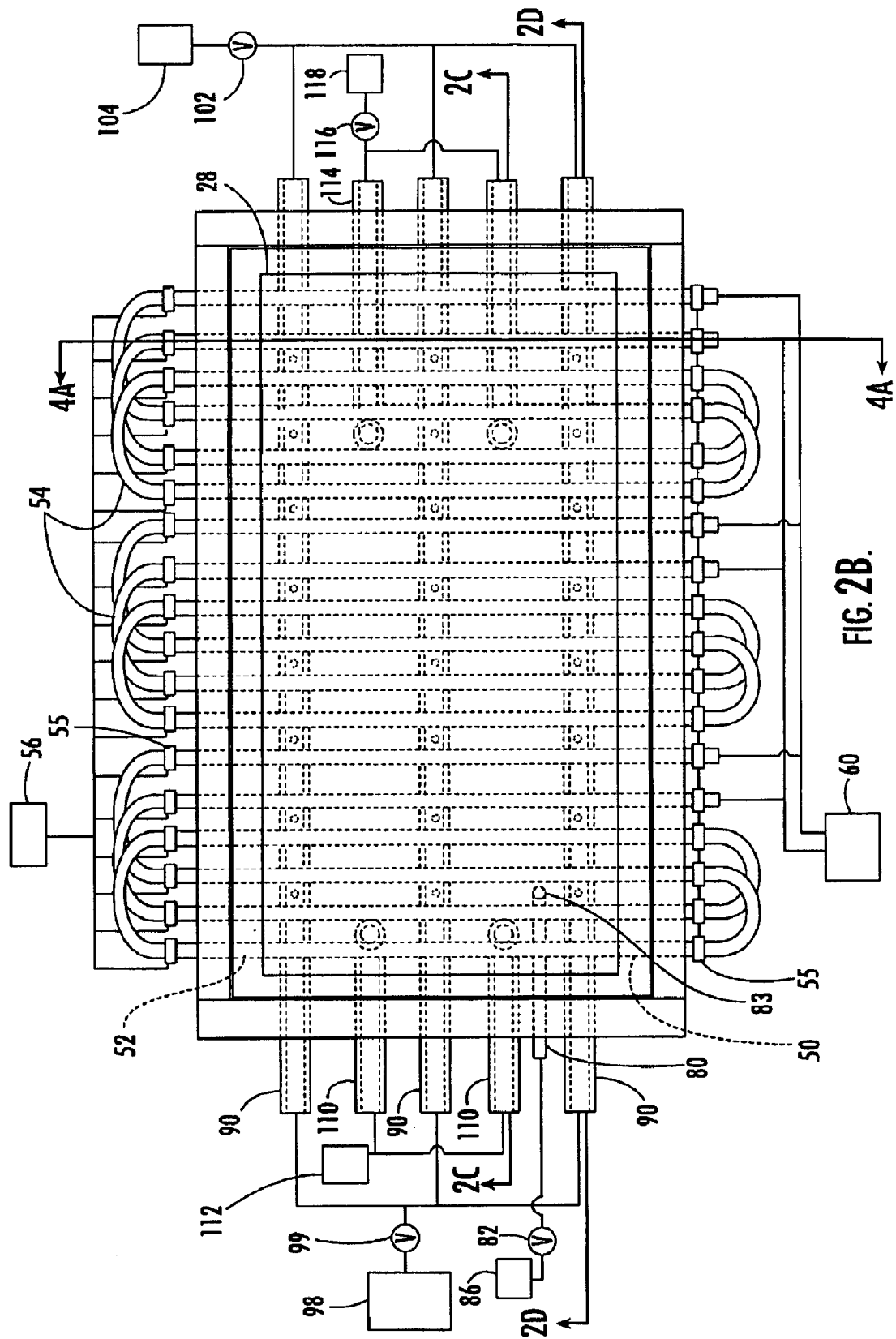
FIG. 2B is a plan view illustrating the forming apparatus for superplastically forming a structural assembly, according to another embodiment of the present invention.

Referring now to the drawings, and in particular to FIG. 2A, there is illustrated a forming apparatus 10, according to one embodiment of the present invention. The forming apparatus 10 includes first and second dies 20, 22, which are mounted on first and second strongbacks 34, 36 respectively, that are secured using a mechanical support structure comprising a base 18a and a pair of lateral members 18b. A "strongback" is a stiff metallic plate that acts as a mechanical constraint to keep the first and second dies 20, 22 together to thereby maintain the dimensional accuracy of the structural assembly being formed. The first and second dies 20, 22 are co-operable and configured to define a die cavity 28 therebetween structured to at least partially receive and form at least one SPF pack or preform 14, such as the one illustrated in FIG. 5, into a structural assembly 16, such as the one shown in FIG. 6. As illustrated in FIG. 2C, at least one of the first and second dies 20, 22 includes a forming surface 24, which defines a predetermined configuration structured to shape the preform 14 so that the preform 14 is superplastically formed into a structural assembly 16 having the desired configuration. As illustrated in FIG. 3A, both the first and second dies 20, 22 can include a respective forming surface 24a, b.

The first and second dies 20, 22 preferably are formed of a material having a low thermal expansion, high thermal insulation, and a low electromagnetic absorption. According to one embodiment of the present invention, the dies 20, 22 are formed of cast ceramic, for example, using a castable fusible silica product such as Castable 120 available from Ceradyne Thermo Materials of Scottdale, Ga. Castable 120 has a coefficient of thermal expansion less than about 0.45/(° F.×10$^6$), a thermal conductivity of about 4.3 Btu/(hr)(ft$^2$)(° F./in), and a low electromagnetic absorption. The low thermal expansion of the dies 20, 22 allows the dies 20, 22 to support large thermal gradients without developing high stress gradients which can result in spalling.

The dies 20, 22 are contained, at least partially within a phenolic structure 30, which can be reinforced with fibers and/or fiberglass reinforcing rods 32. The rods 32 can extend both longitudinally and transversely through the phenolic structure 30 and the first and second dies 20, 22, as illustrated in FIGS. 2A and 2C. To provide a post-stressed compressive state to the first and second dies 20, 22, the rods 32 preferably are placed through the phenolic structure 30 and secured within the first and second dies 20, 22 at the time of casting. Thereafter, nuts 33 at the ends of the rods 32 can be tightened to provide the post stressed compressive state to prevent cracking or other damage to the dies 20, 22. The first and second dies 20, 22, the phenolic structure 30, and the reinforcement rods 32 are described in U.S. Pat. No. 5,683,608 entitled "Ceramic Die for Induction Heating Work Cells," which issued on Nov. 4, 1997, and which is assigned to the assignee of the present invention and is incorporated herein by reference.

Figure 4A:
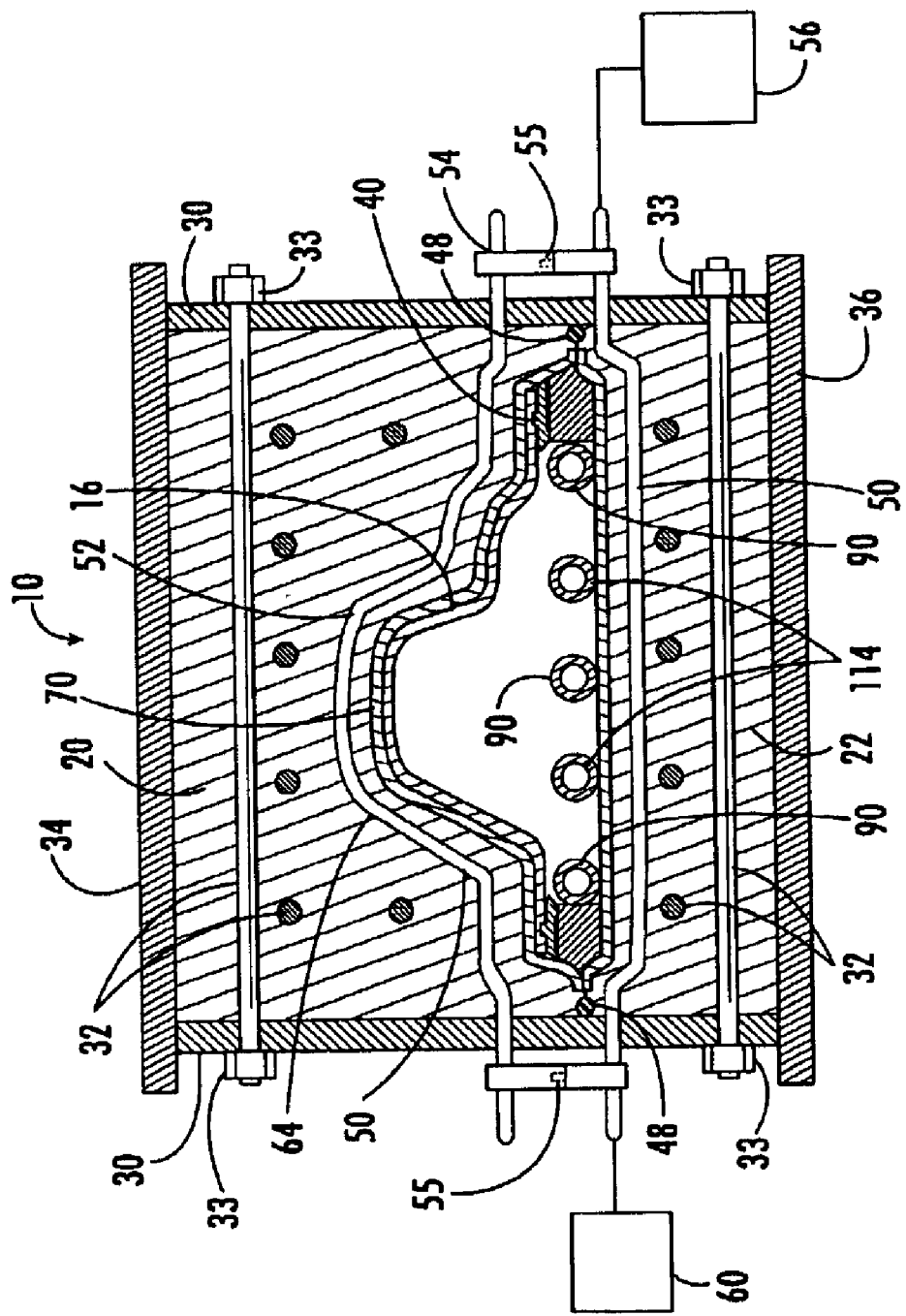
FIG. 4A is a section view illustrating the forming apparatus of FIG. 2B as seen along line 4A—4A of FIG. 2B.
Figure 4B:
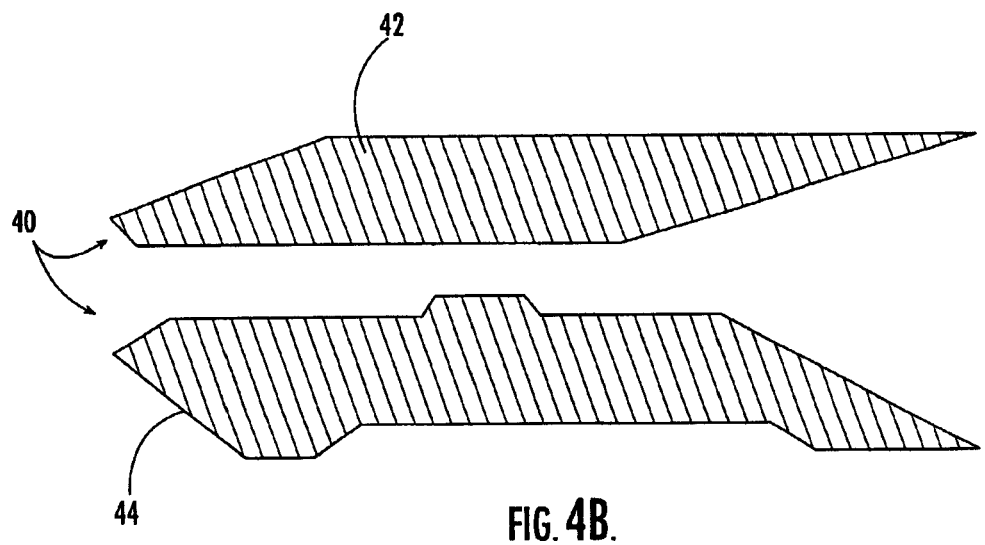
FIG. 4B is a section view illustrating the first and second portions of the sealing frame, according to one embodiment of the present invention.

As illustrated in FIGS. 4A and 4B, the forming apparatus 10 includes a sealing frame 40, which extends along the perimeter of the die cavity 28 and seals the die cavity. As illustrated in FIG. 4B, the sealing frame 40 includes a first portion 42 secured to the first die 20 and a second portion 44 secured to the second die 22. The first and second portions 42, 44 of the sealing frame 40 are contoured so as to engage the peripheral edge of the preform 14 to provide a hermetic seal with the preform 14. The first and second portions 42, 44 of the sealing frame 40 are urged into contact with the preform 14 by closing the dies 20, 22 so that the first and second portions 42, 44 are pressed firmly against the preform 14. At least the periphery of the preform 14 can be heated prior to being positioned within the die cavity 28 so that the preform 14 more easily conforms to the first and second portions 42, 44 of the sealing frame 40. As illustrated in FIG. 4A, the forming apparatus 10 also can include an elastomeric seal 48 positioned between the dies 20, 22 that prevents the release of gas or fluids from the die cavity 28.

Figure 2C:
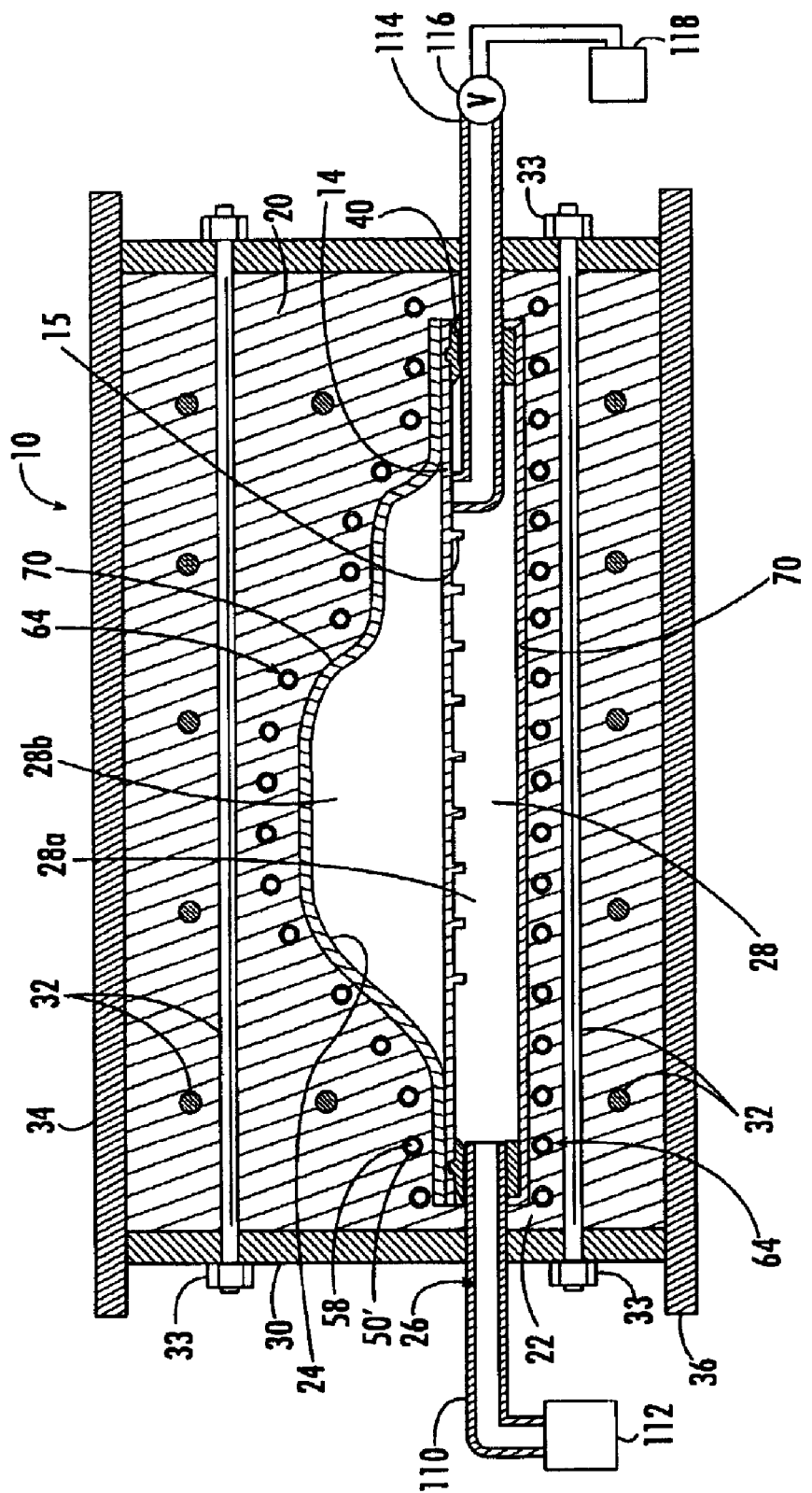
FIG. 2C is a section view illustrating the forming apparatus of FIG. 2B as seen along line 2C—2C of FIG. 2B.
Figure 2D:
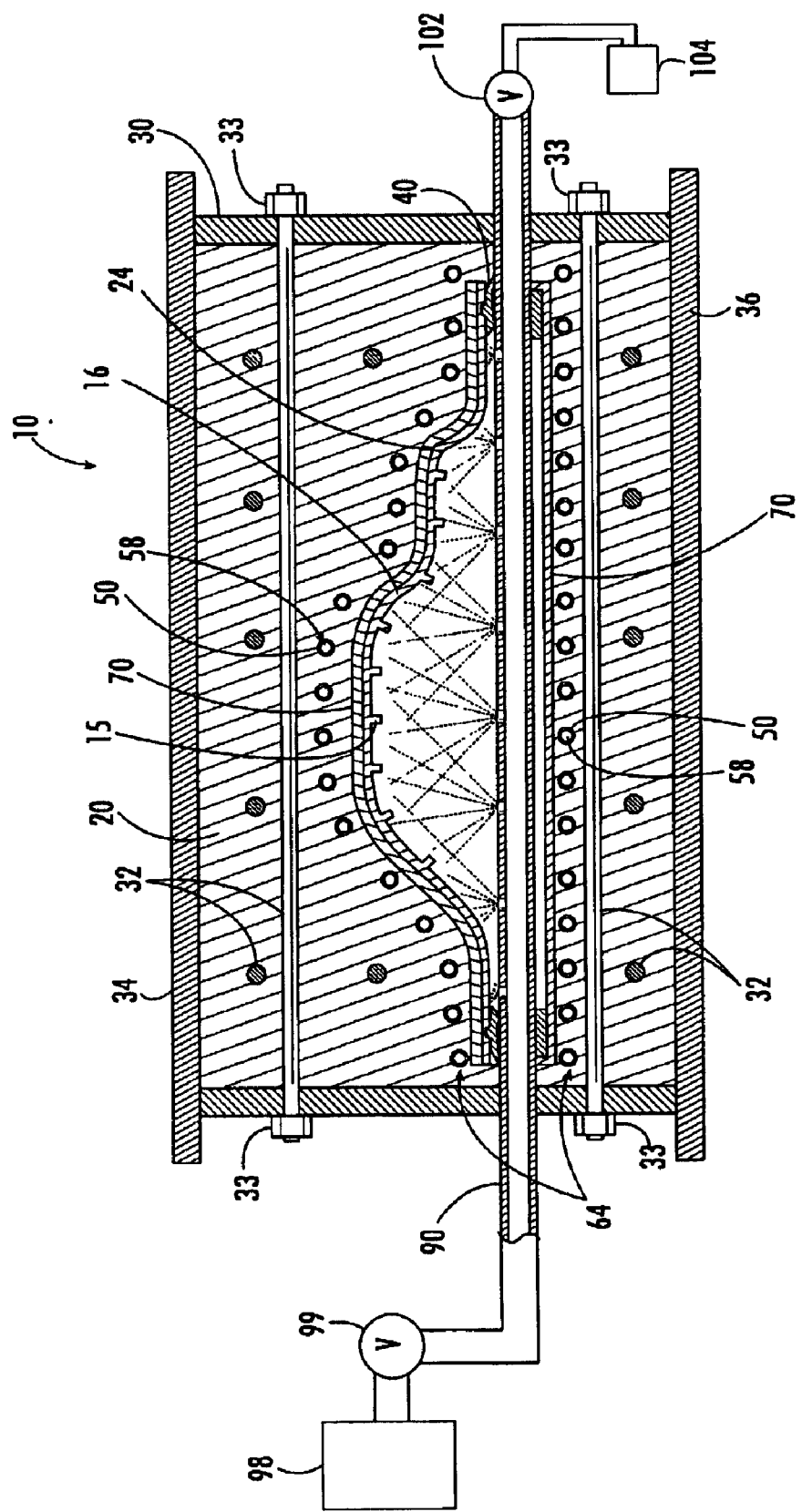
FIG. 2D is a section view illustrating the forming apparatus of FIG. 2B as seen along line 2D—2D of FIG. 2B.
Figure 3A:
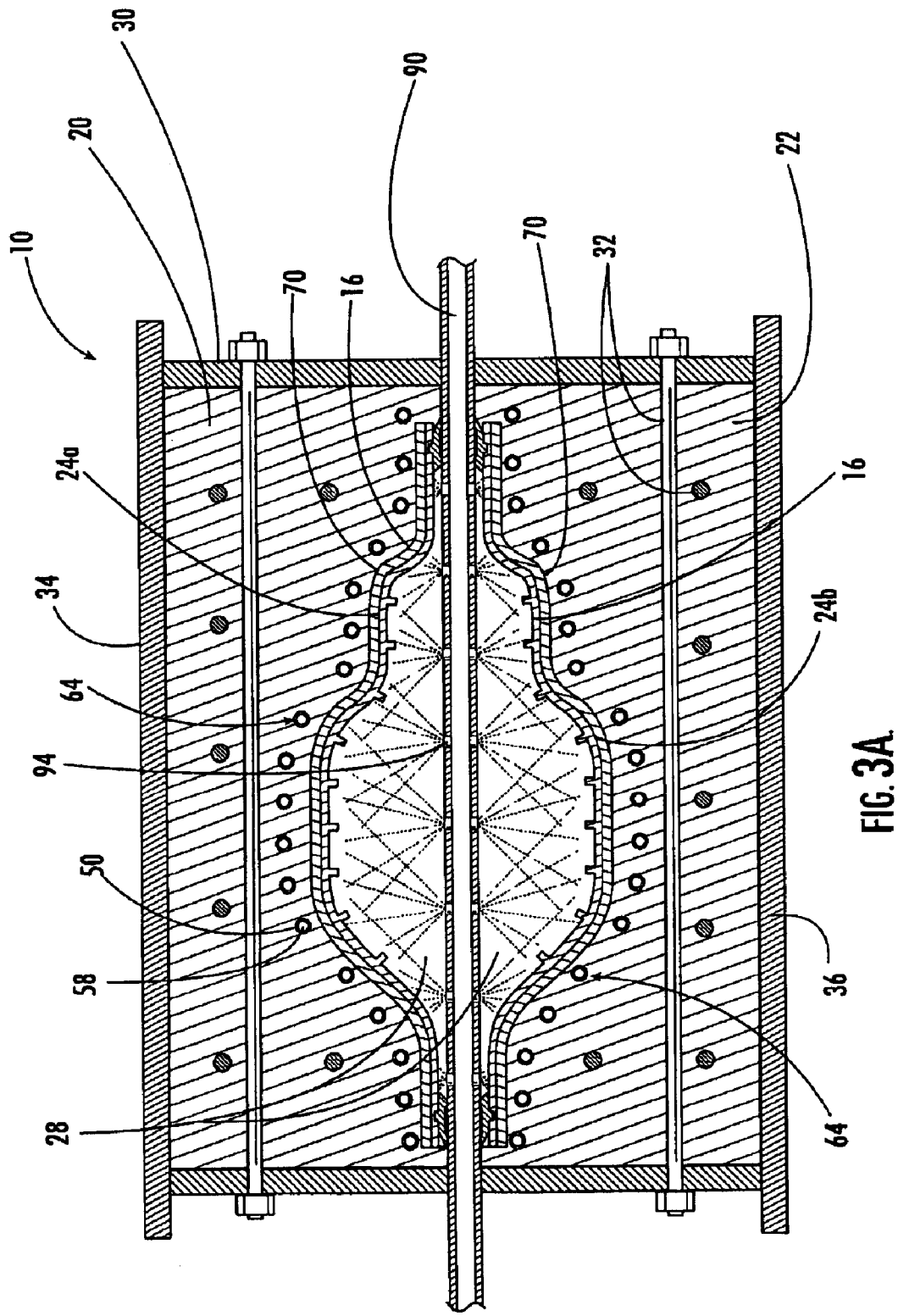
FIG. 3A is a section view illustrating a forming apparatus, according to another embodiment of the present invention.
Figure 2E:
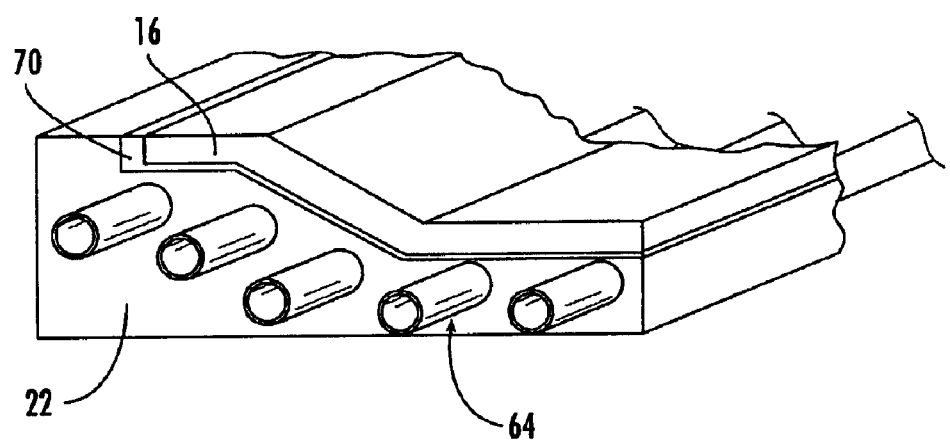
FIG. 2E is a fragmentary perspective view illustrating a die, according to one embodiment of the present invention.

As illustrated in FIGS. 2C, 2D, and 3A, at least one of the first and second dies 20, 22, includes a heater 64 for heating the preform 14 to a forming temperature. The heater 64 can comprise any known heating device including, for example, a gas or electric oven. According to one embodiment, at least one of the first and second dies 20, 22 includes at least one susceptor 70, as described more fully below, and the heater 64 comprises at least one induction coil 50, such as a solenoid coil, for inducing an electromagnetic field in the susceptor. Each induction coil 50 includes a plurality of elongate tube sections 52 that are interconnected by curved tube sections 54 to form a coil that is positioned proximate to the die cavity 28 and the corresponding susceptor 70 in which the electromagnetic field is to be induced. In one embodiment, the tube sections 52 are formed of 1.0 inch diameter copper tubing with a 0.0625 inch wall thickness. Lightly drawn copper tubing can be used so that the tube sections 52 can be adjusted as necessary to correspond to the configuration of the corresponding die 20, 22. Each curved tube section 54, which can be formed of a flexible, non-conductive material such as plastic, preferably connects tube sections 52 that are disposed within only one of the two dies 20, 22 so that the dies 20, 22 can be opened to expose the die cavity 28 without disconnecting the tube sections 52 connected by the respective curved tube section 54. The tube sections 52 of the two dies 20, 22 can also be electrically connected by pin connections 55, as shown in FIG. 4A, which can be disconnected when the dies 20, 22 are opened to expose the die cavity 28. The pin connections 55 are preferably formed of a conductive material such as brass or copper.

Figure 9A:
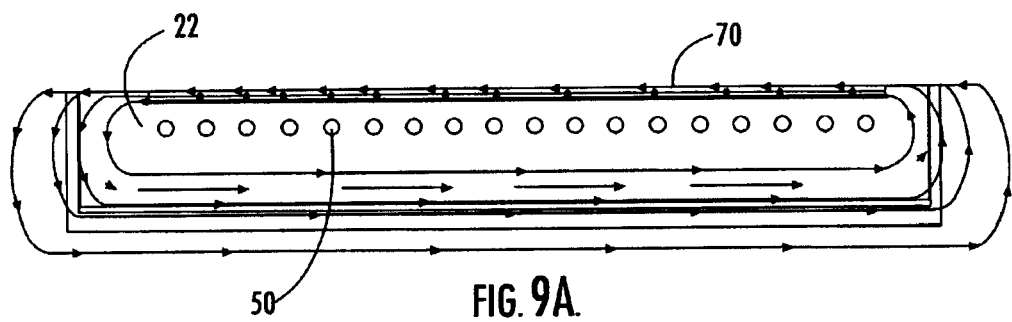
FIG. 9A is an elevation view illustrating a susceptor having an induced electromagnetic field, according to one embodiment of the present invention.

The induction coil 50 is capable of being energized by one or more power supplies 56. Preferably, the power supplies 56 provide an alternating current to the induction coil 50, e.g., between about 3 and 10 kHz. As illustrated in FIG. 9A, this alternating current through the induction coil 50 induces an electromagnetic field within the susceptor 70 that heats the susceptor and, thus, the preform 14 and the structural assembly 16. The temperature of the susceptor 70 and the preform 14 can be determined by monitoring the power supplied by the one or more power supplies 56, as described in U.S. application Ser. No. 10/094,494, entitled "Induction Heating Process Control," filed Mar. 8, 2002, and which is assigned to the assignee of the present invention and is incorporated herein by reference.

Due to the low electromagnetic absorption of the dies 20, 22, the induction coil 50 induces an electromagnetic field within the susceptor 70 without inducing an appreciable electromagnetic field in the dies 20, 22. Therefore, the susceptor 70 can be heated to high temperatures without heating the dies 20, 22, thereby saving energy and time. Additionally, the low thermal conductivity of the ceramic dies 20, 22 reduces heat loss from the die cavity 28 and, thus, the preform 14 and/or structural assembly 16.

As illustrated in FIG. 2D, the induction coil 50 preferably defines a passage 58 for circulating a cooling fluid, such as water, from a coolant source 60. (FIG. 2A). A pump (not shown) circulates the cooling fluid from the coolant source 60 through the passage 58. The cooling fluid cools the induction coil 50 to prevent the coil from overheating. In addition, because the induction coil 50 preferably is uniformly positioned relative to the susceptor 70, the induction coil will not only uniformly heat the susceptor 70, but the coolant will transfer heat away from the susceptor 70, thereby cooling the susceptor 70.

The at least one susceptor 70 preferably is cast within the corresponding first and second dies 20, 22. The thickness of the cast ceramic between the susceptor 70 and forming surface 24 of the corresponding die 20, 22 can vary, but preferably is about 0.75 inches thick. The susceptor 70 is formed of a material that is characterized by a Curie temperature at which the susceptor becomes paramagnetic, for example, a ferromagnetic alloy such as an alloy comprising iron and nickel. Susceptors having Curie temperatures at which each susceptor becomes non-magnetic, or paramagnetic, are described in U.S. Pat. No. 5,728,309 entitled "Method for Achieving Thermal Uniformity in Induction Processing of Organic Matrix Composites or Metals," which issued on Mar. 17, 1998; U.S. Pat. No. 5,645,744 entitled "Retort for Achieving Thermal Uniformity in Induction Processing of Organic Matrix Composites or Metals," which issued on Jul. 8, 1997; and U.S. Pat. No. 5,808,281 entitled "Multilayer Susceptors for Achieving Thermal Uniformity in Induction Processing of Organic Matrix Composites or Metals," which issued on Sep. 15, 1998, each of which is assigned to the assignee of the present invention and is incorporated herein by reference. The susceptor 70 can define a contoured surface and can include an oxidation resistant nickel aluminide coating, which can be flame-sprayed or otherwise disposed on the surface of the susceptor 70. A description of a susceptor with a nickel aluminide coating is provided in U.S. application Ser. No. 10/032,625, entitled "Smart Susceptors with Oxidation Control," filed Oct. 24, 2001, and which is assigned to the assignee of the present invention and is incorporated herein by reference.

Figure 9B:
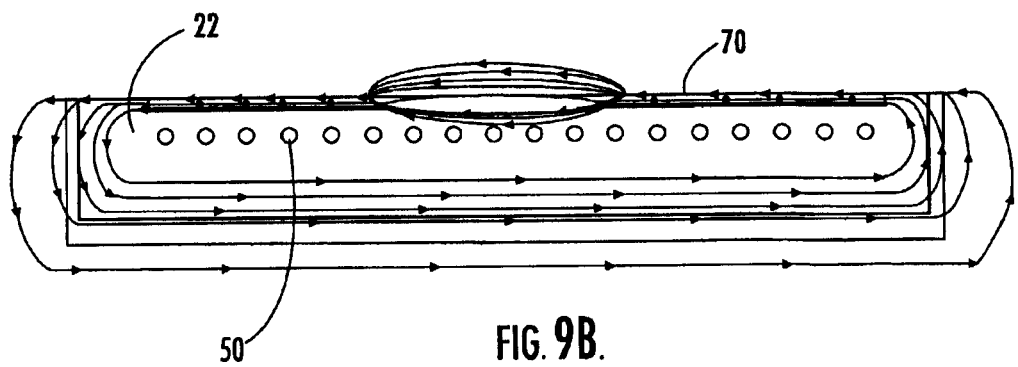
FIG. 9B is an elevation view illustrating the susceptor of FIG. 9A wherein a portion of the susceptor has reached its Curie temperature and become paramagnetic.

As illustrated in FIGS. 9A and 9B, the susceptor 70 is heated through eddy current heating to the Curie temperature of the susceptor 70, whereupon the susceptor 70 becomes paramagnetic and does not heat further. If some portions of the susceptor 70 are heated more quickly than other portions, the hotter portions will reach the Curie temperature and become paramagnetic before the other, cooler portions of the susceptor 70. As illustrated in FIG. 9B, the eddy currents will then flow through the cooler magnetic portions, i.e., around the hotter, paramagnetic portions of the susceptor 70, causing the cooler portions to also become heated to the Curie temperature. Therefore, even if some portions of the susceptor 70 heat at different rates, the entire susceptor 70 is heated to a uniform Curie temperature.

Eddy current heating of the susceptor 70 results from eddy currents that are induced in the susceptor by the electromagnetic field generated by the induction coil 50. The flow of the eddy currents through the susceptor 70 results in resistive losses and heating of the susceptor 70. Preferably, the susceptor 70 acts as a magnetic shield that prevents the induction coil 50 from inducing an electromagnetic field in the preform 14 and/or structural assembly 16. As such, the induction coil 50 does not heat the preform 14 and/or structural assembly 16 directly, but rather heats the susceptor 70 which, in turn, acts as a heat sink for heating the preform 14 and/or the structural assembly 16.

Preferably, the Curie temperature of the susceptor 70 is equal to a forming temperature of the preform 14, i.e., the temperature at which the preform 14 becomes superplastically formable. Thus, the susceptor 70 can be used to heat the preform 14 uniformly to the forming temperature so that the preform 14 can be formed into a structural assembly 16. The susceptor 70 can be formed of a variety of materials including cobalt, iron, nickel, and alloys thereof, and the composition of the susceptor 70 can be designed to achieve a desired Curie temperature that is appropriate for a particular type of preform material. For example, susceptors with Curie temperatures between about 860° F. and 1005° F. can be used for processing preforms that are formed of aluminum and aluminum alloys. In one embodiment, the susceptor 70 is formed of an alloy comprising 50% iron and 50% nickel. This iron-nickel alloy has a Curie temperature of about 968° F., at which temperature aluminum and certain aluminum alloys can be superplastically formed. Preferably, the Curie temperature is also equal to a heat-treatment temperature of the preform material, e.g., a temperature at which the preform material can be solution heat treated. For example, aluminum can be solution heat treated at temperatures between about 860° F. and 1005° F. Thus, the preform 14 can be held at the forming temperature, e.g., 968° F., for a predetermined period of time, such as about 30 to 45 minutes for aluminum and aluminum alloys, and thereby solution heat treated.

As illustrated in FIG. 2B, the forming apparatus 10 preferably includes injectors 80, 90 for injecting pressurized gas and quenching fluid into the die cavity 28. Each injector 80, 90 comprises a passage such as a pipe or other tubular member that extends to, and is fluidly connected to, the die cavity 28. Each injector 80, 90 can also be sealably attached to the first and/or second portions 42, 44 of the sealing frame 40 so that the sealing frame 40 forms a hermetic seal around the injectors 80, 90. Although separate injectors 80, 90 are provided for injecting the pressurized gas and the quenching fluid in the illustrated embodiments, a combination injector (not shown) can alternatively be provided for injecting both the gas and the fluid.

The gas injector 80 is fluidly connected to a pressurized gas source 86 and extends into the die cavity 28. The gas injector 80 defines at least one gas port 83 through which heated pressurized gas can be injected into the die cavity 28. Thus, the pressurized gas source 86 is fluidly connected to the die cavity 28 so that pressurized gas from the gas source 86 can be injected into the die cavity 28 to form the preform 14. A pressure regulator 82, which is fluidly connected to the pressurized gas source and the gas injector 80, is configured to control the flow of gas into the die cavity 28 and thereby regulate the pressure in the die cavity 28 to a preselected pressure. For example, the pressure inside the die cavity 28 would not exceed about 300 psi when superplastically forming aluminum and aluminum alloys. One or more apertures 114 can fluidly connect the die cavity 28 to a condenser 118 for receiving the pressurized gas from the die cavity 28, and a valve 116 can regulate the flow of the pressurized gas from the die cavity 28 to the condenser 118.

Figure 5:
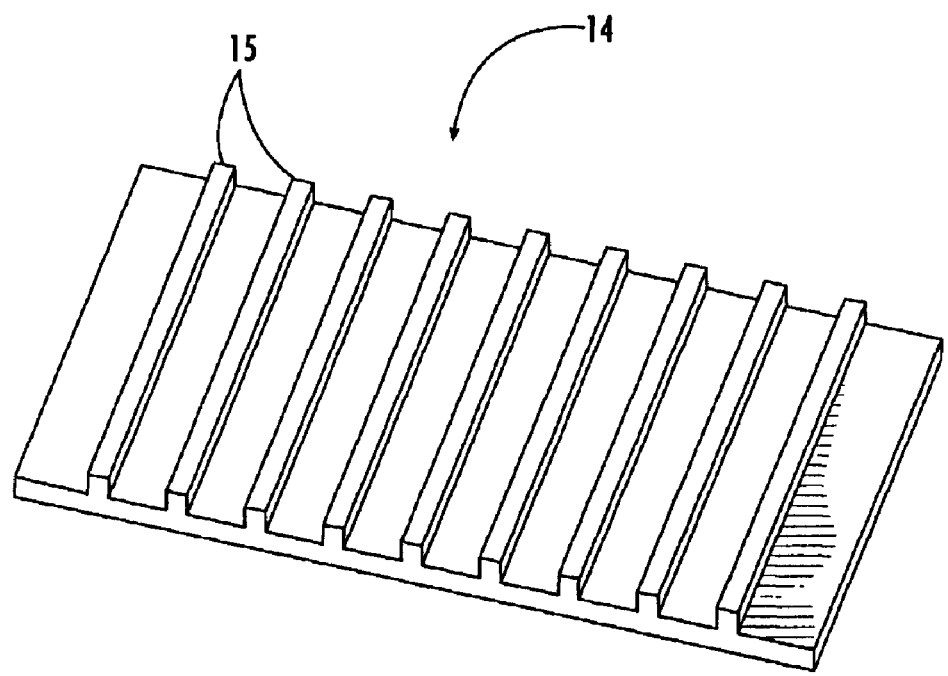
FIG. 5 is a perspective view illustrating a preform that can be superplastically formed to manufacture a structural assembly according to one embodiment of the present invention.
Figure 6:
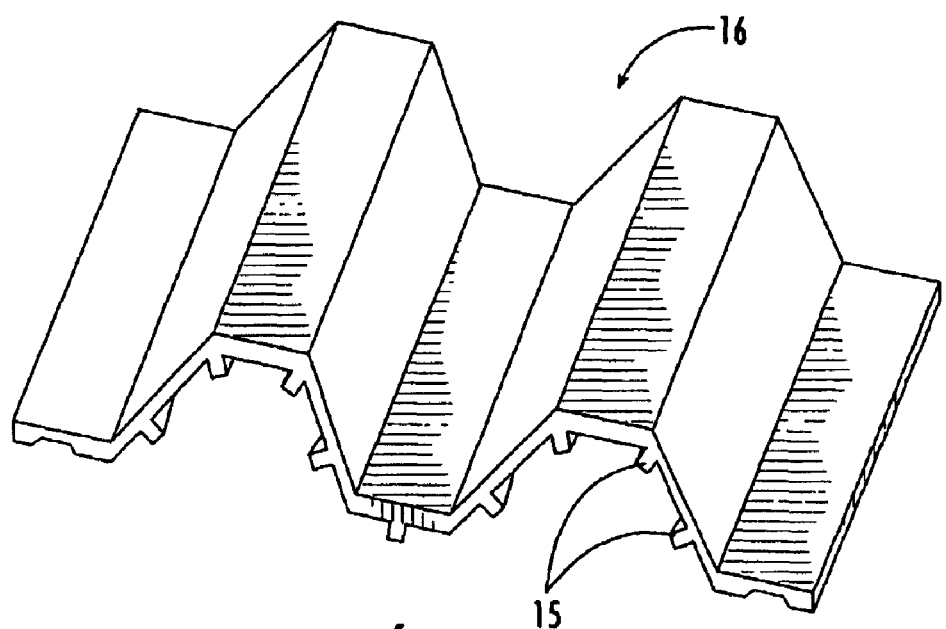
FIG. 6 is a perspective view illustrating a structural assembly that has been superplastically formed from the preform of FIG. 5.
Figure 7:
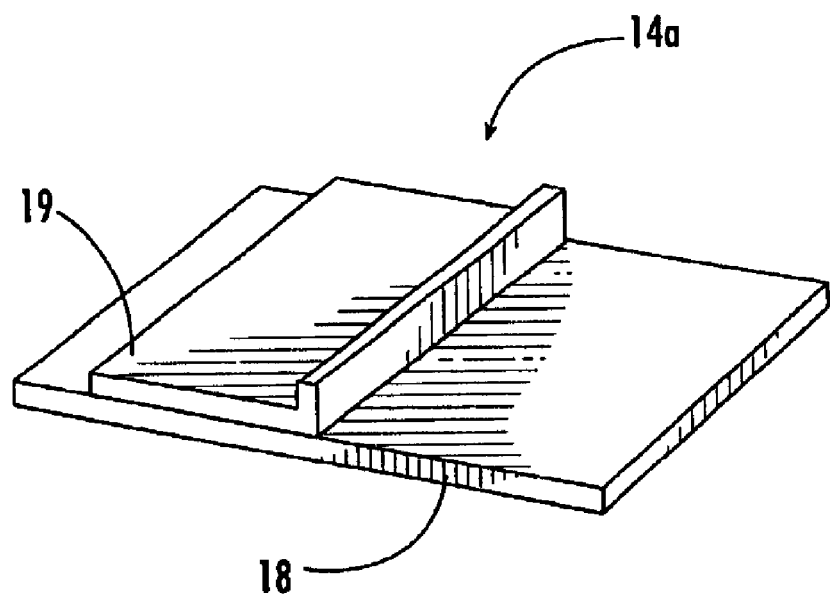
FIG. 7 is a perspective view illustrating another preform that can be superplastically formed to manufacture a structural assembly according to another embodiment of the present invention.

According to one embodiment, as illustrated in FIG. 2C, when superplastically forming a preform 14, such as a single sheet of material or a relatively simply multi-sheet forming pack, as illustrated in FIGS. 5 and 7, the preform 14 is positioned within the die cavity 28 such that the preform is disposed between the injector 80 and the forming surface 24 of the corresponding die or dies 20, 22. As discussed above, the periphery of the preform 14 is secured using the first and second portions 42, 44 of the sealing frame 40. In this position, the preform 14 divides the die cavity 28 into two portions or sections 28a, 28b. One portion 28a includes the injectors 80, 90 and the other portion 28b includes the forming surface 24. Thus, as gas enters the die cavity 28 from the gas injector 80, the gas flows into the first portion 28a of the die cavity 28 and increases the pressure in the first portion 28a so that it exceeds the pressure in the second portion 28b. The preform 14, which is heated to its superplastic forming temperature, is urged by the high pressure in the first portion 28a against the forming surface 24 of the dies 20, 22, thus, superplastically forming the structural assembly 16. As the preform 14 is urged toward the forming surface 24, the volume of the first portion 28a of the die cavity 28 increases and the volume of the second portion 28b of the die cavity decreases. Gas present in the second portion 28b of the die cavity 28 can be released through a gas outlet (not shown). Alternatively, the gas in the second portion 28b can seep out of the die cavity 28 through unsealed gaps in the dies 20, 22, or the gas can be compressed within the second portion 28b of the die cavity 28.

Alternatively, the preform 14 can include a multi-sheet sealed forming pack in which one or more of the edges of the preform 14 have been welded using fusion or friction stir welding. A preform 14 comprises multi-sheet seal forming pack formed with friction stir welding and/or fusion welding is described in U.S. application Ser. No. 09/818,325 entitled "Application of Friction Stir Welding to Superplastically Formed Structural Assemblies," which was filed on Mar. 27, 2001, and which is assigned to the assignee of the present invention and is hereby incorporated by reference. Such preforms 14 typically have internal plumbing (not shown) which can be connected to the gas port 83 of the injector 80 using suitable fittings, as is well known in the art. Such preforms are superplastically formed by injecting the heated pressurized gas through the injector 80 and the gas port 83 and into the plumbing and interior of the preform to thereby fill the preform and urge it against the forming surfaces 24 of the first and second dies 20, 22.

Figure 3B:
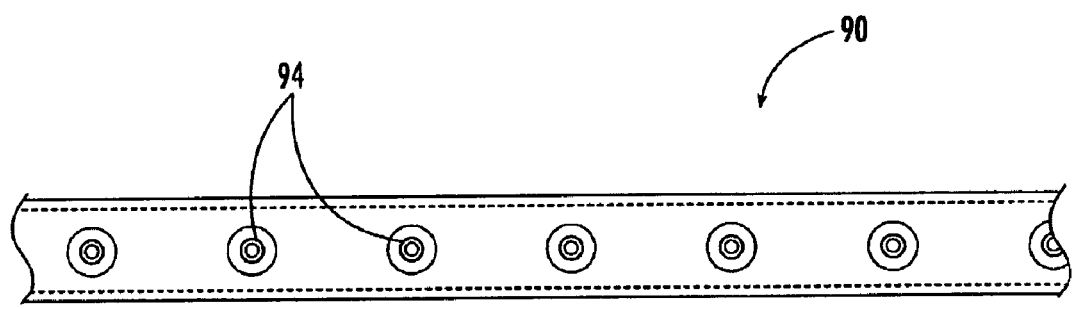
FIG. 3B is a fragmentary elevation view illustrating an injector for supplying quenchant to the die cavity, according to one embodiment of the present invention.

Similarly, the quench injectors 90 are fluidly connected to a quenching fluid source 98, thus fluidly connecting the quenching fluid source 98 to the die cavity 28. In the illustrated embodiments, the quench injectors 90 extend through the die cavity 28, but in other embodiments, each injector 90 can terminate within the die cavity 28. As shown in FIG. 3B, each quench injector 90 includes a plurality of nozzles 94 that are configured to direct the quenching fluid in the direction of the forming surface 24, i.e., toward the structural assembly 16. If the combination injectors are used, the nozzles 94 can also function as the gas port 83. The quenching fluid or "quenchant" can comprise a cooling liquid, including, but not limited to, water, glycol, oils, salt solutions, and mixtures thereof. The quenching fluid can also comprise a gas, such as air, or a liquid-gas mixture, i.e., a 2-phase mist of liquid and gas. The forming apparatus 10 can also provide a quenching reservoir 104 that is fluidly connected to the injectors 90. A valve 102 is configured to control the flow of the quenching fluid from the injectors 90 into the reservoir 104, so that the reservoir 104 can be selectively connected to the injectors 90. Further, at least one drain reservoir 112 can be fluidly connected to the die cavity 28 by apertures 110 to receive the quenching fluid therefrom.

In operation, the quenching fluid or "quenchant" enters the die cavity 28 at a temperature that is less than the temperature of the structural assembly 16 so as to rapidly cool the structural assembly 16. For example, the quenching fluid can comprise liquid water at room temperature, i.e., about 70° F. The phase and temperature of the quenching fluid depends on the material forming the preform 14 and the desired material properties of the structural assembly 16. Preferably, the quenching fluid is able to absorb sufficient heat from the structural assembly 16 so as to cool the structural assembly 16 at a rate that causes quenching of the structural assembly 16 and yields the desired material properties. The rate of cooling of the structural assembly 16 will depend on a variety of factors, including the forming temperature of the structural assembly 16, the temperature of quenching fluid, the heat capacities of the structural assembly 16 and the quenching fluid, the mass and surface area of the structural assembly 16, and the rate at which the quenching fluid is sprayed onto the structural assembly 16. In one embodiment, the structural assembly 16 is quenched so that the temperature of the structural assembly is reduced at a rate of at least 100° F. per second from a temperature of about 980° F. to less than about 300° F. and, more preferably, to less than about 150° F.

The pressure in the die cavity 28 during quenching can be regulated by adjusting the valve 102. For example, during initiation of the quenching process, the quenching fluid may be rapidly vaporized as the relatively cool fluid contacts the heated injectors 90, resulting in an increase in pressure in the injectors 90 and the die cavity 28. By opening the valve 102 during the quenching process, the quenching fluid can be received by the reservoir 104, and the increase in pressure can be controlled. The valve 102 can be closed as the flow of quenching fluid becomes established, the injectors 90 cool, and the pressure in the injectors 90 stabilizes.

Preferably, the die cavity 28 is maintained at an elevated pressure during quenching by the injectors 90 so that the structural assembly 16 is held securely against the forming surface 24 of the corresponding die or dies 20, 22, thereby constraining, or at least reducing, deformation of the structural assembly 16 during the quenching process. Thus, pressure inside the structural assembly 16 presses the structural assembly 16 against the dies 20, 22 during the quenching operation, and the dies 20, 22 constrain the structural assembly 16 by resisting deformation thereof. As the quenching fluid is sprayed on the structural assembly 16, gas and/or quenching fluid can be released from the die cavity 28 so that the pressure in the die cavity 28 does not exceed a predetermined maximum. The gas and/or quenching fluid are drained from the die cavity 28 through the apertures 110 to the drain reservoir 112. Preferably, the apertures 110 fluidly connect to the die cavity 28 at the lowest portions of the die cavity 28 so that gravity draws the quenching fluid through the apertures 110. Similarly, the gas and/or the vaporized quenching fluid can be released from the die cavity 28 through the apertures 114 to the condenser 118. For example, gas injected into the die cavity 28 from the gas source 86 during the forming process can be released through the apertures 114. Vaporized quenching fluid can condense in the condenser 118 and be reclaimed, for example, for re-use as the quenching fluid. Preferably, the apertures 114 are connected to the condenser 118 via a valve 116, which can be adjusted to control the release of the quenching fluid from the die cavity 28. Alternatively, the gas and the quenching fluid can be released from one or more common apertures (not shown), which can also be used as the gas ports 83 and/or the nozzles 94 of the combination injector for injecting the pressurized gas and the quenching fluid.

After forming and after or instead of quenching, the structural assembly 16 can also be aged in the forming apparatus 10 by heating the structural assembly 16 according to a predetermined temperature schedule, i.e., by heating the structural assembly 16 to an appropriate aging temperature for a predetermined duration. The aging temperature and duration of aging depend on the material forming the structural assembly 16 and the desired mechanical properties, as is well known in the art. The structural assembly 16 can be heated for aging by placing the dies 20, 22 and the structural assembly 16 in an oven. Alternatively, the induction coil 50 can reheat the structural assembly 16. If the aging temperature is different than the forming temperature, the structural assembly 16 can be transferred to a secondary set of dies (not shown) containing a second susceptor (not shown) that can be used to control the temperature of the structural assembly 16.

Figure 8:
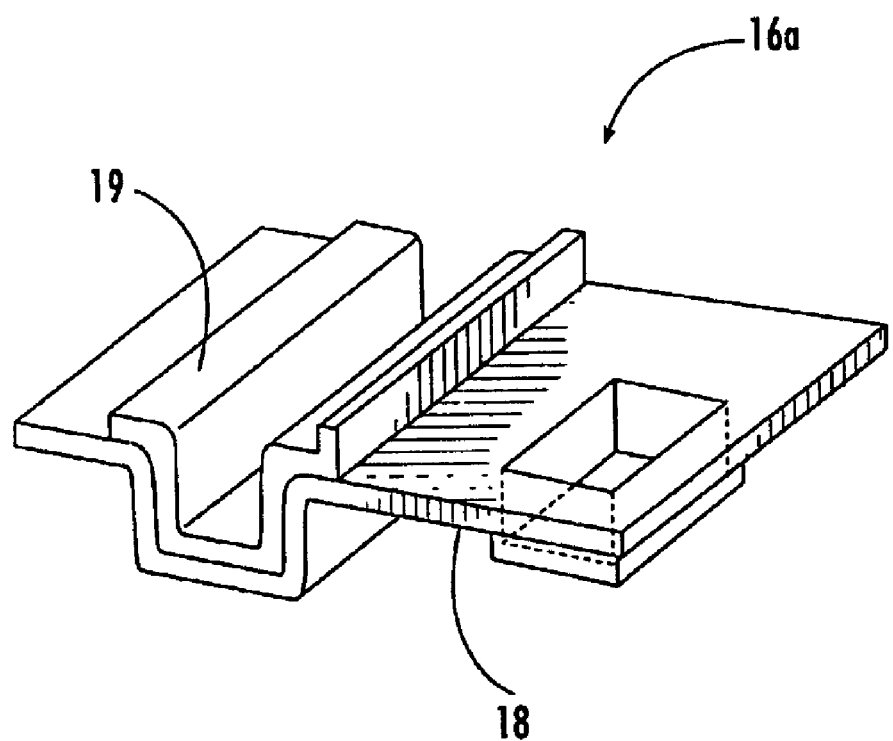
FIG. 8 is a perspective view illustrating a structural assembly that has been superplastically formed from the preform of FIG. 7.

The forming apparatus 10 can be used to form structural assemblies 16 of various configurations from preforms 14 of different types. For example, the preform 14 and structural assembly 16 shown in FIGS. 2C and 2D are shown individually in FIGS. 5 and 6, respectively. The preform 14 is a flat sheet comprised of aluminum from which flanges 15 extend perpendicularly. The flanges 15 can be formed, for example, by friction stir welding the flanges 15 to the flat sheet or by machining a monolithic piece of stock material. In other embodiments, the preform 14 and, hence, the structural assembly 16, can be formed of a variety of metals and metal alloys. However, the preform 14 and structural assembly 16 preferably are formed of a metal or metal alloy having a high strength to weight ratio, including, for example, aluminum alloys, titanium, and titanium alloys. In addition, preforms can comprise built-up structures of multiple sheets, angles, channels, tubes, other stock shapes, or specially prepared shapes, each of which can comprise different materials. For example, FIG. 7 illustrates a preform 14a that comprises a first member 18, which is a flat sheet, and a second member 19, which is a preformed shape. The multiple members 18, 19 of the built-up preform 14a can be assembled using bolts, rivets, crimps, various welded connections, including weld joints formed of fusion and/or friction stir welding. The built-up preform 14a is then superplastically formed as described above to form a structural assembly 16a as shown in FIG. 8. The structural assembly 16a can define angles, channels, pockets, and the like and the material characteristics of the structural assembly 16a, such as thickness and material type, can vary throughout the structural assembly 16a. Thus, the structural assembly 16 formed according to the present invention may be formed in a variety of complex three-dimensional shapes having fine details and satisfying narrow tolerances, and can be used in a variety of applications, including the primary or secondary structure of an aircraft.

Many variations of the forming apparatus 10 of the present invention are possible. In this regard, the forming surface 24 of the forming apparatus 10 can be defined by part or all of the first die 20 and the second die 22, and the injectors 90 can be directed toward either or both dies 20, 22. For example, the forming surface 24 of the forming apparatus 10 illustrated in FIGS. 2C and 2D is defined by only the first die 20. Alternatively, as illustrated in FIG. 3, the forming surfaces 24 are defined by both the first and second dies 20, 22. Two preforms 14 are formed in the forming apparatus by urging each preform 14 against a corresponding one of the dies 20, 22. The preforms 14 are configured on opposite sides of the injectors 90 so that the preforms 14 are urged outward against the dies 20, 22 and quenched by quenching fluid that is sprayed outward from the injectors 90. Additionally, as described above, the forming apparatus 10 can also be used to produce structural assemblies by injecting gas into and expanding a sealed pack comprising multiple members.

Figure 10:
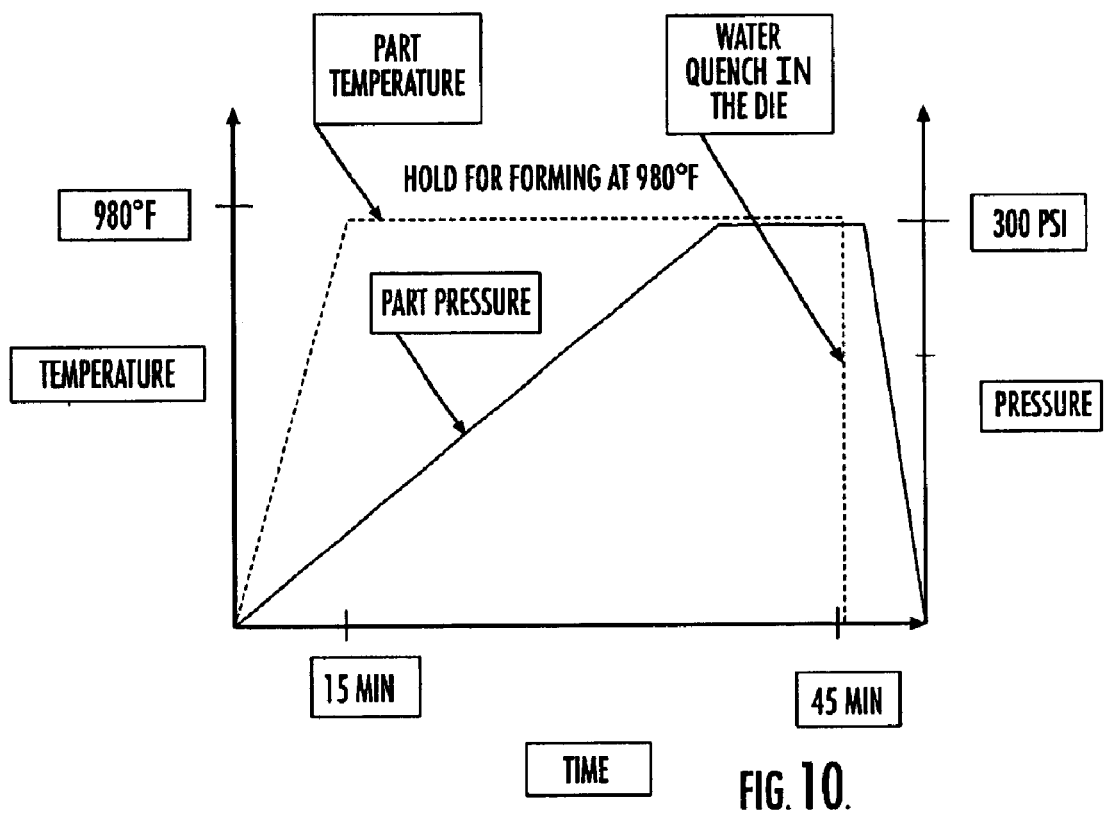
FIG. 10 is a forming profile for aluminum alloys, illustrating the temperature and pressure within the die cavity during the forming processes, according to one embodiment of the present invention.

There is shown in FIG. 10 a forming profile for aluminum alloys according to one embodiment of the present invention, which indicates the pressure and temperature variation within the die cavity 28 during the forming processes. As illustrated, the temperature of the preform 14 in the die cavity 28 and the pressure in the die cavity 28 begin at initial conditions, which can be ambient conditions. The temperature in the die cavity 28 is increased in a 15 minute time period to 980° F. by energizing the induction coils 50 and thereby heating the susceptor 70 and, thus, the preform 14. The pressure in the die cavity 28 is gradually increased to 300 psi by injecting gas through the injector 80, thereby urging the preform 14 toward the forming surface 24 of the forming apparatus 10 to superplastically form the structural assembly 16. Although forming may be accomplished in less time, the structural assembly 16 is held at the forming temperature for approximately 30 minutes, thereby effecting a solution heat treatment of the structural member 16. Approximately 45 minutes after the start of the process, water is injected into the die cavity 28 through the injectors 90. During the initial flow of the water into the injectors 90, the valve 102 is open so that the quenching fluid flows through the injectors 90 and into the reservoir 104. As the temperature of the injectors 90 decreases, the valve 102 is closed and the quenching fluid flows through the nozzles 94 to impinge on the structural assembly 16 and thereby reduce the temperature of the structural assembly 16 to its initial temperature at a rate of about 100° F. per second. The quenching fluid and gas in the die cavity 28 are drained through the apertures 110, 114 to the reservoir 112 and the condenser 118, and the pressure in the die cavity 28 is reduced to its initial condition.

Figure 10A:
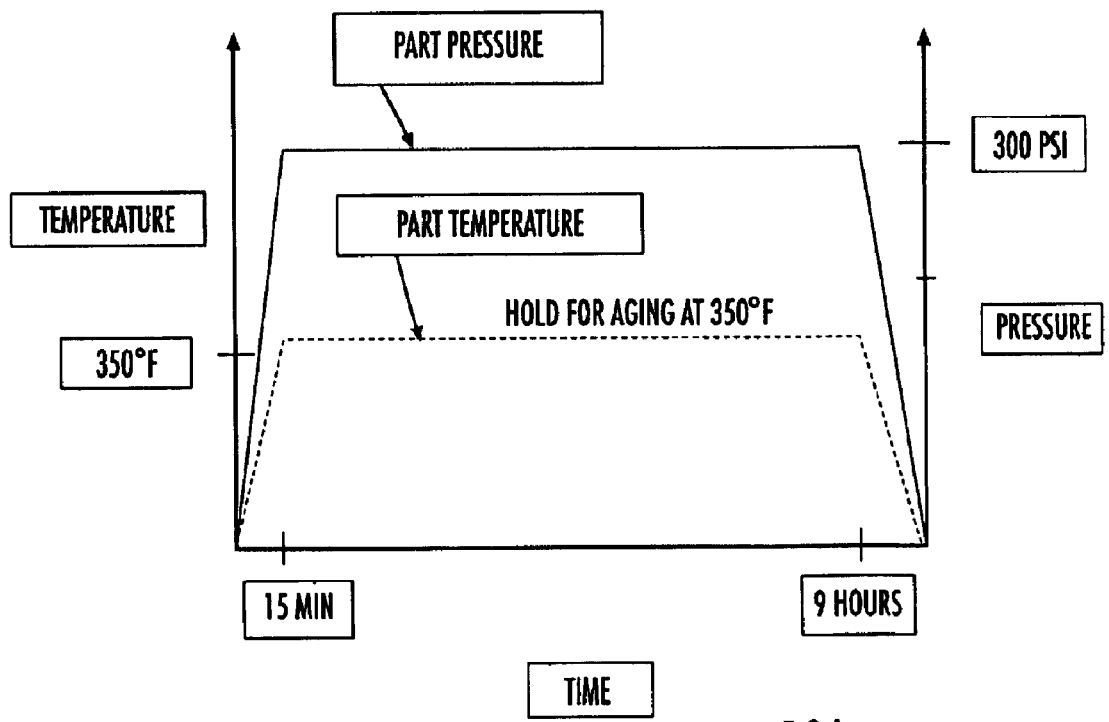
FIG. 10A is an aging profile for aluminum alloys, illustrating the temperature and pressure within the die cavity during the aging processes, according to one embodiment of the present invention.

Similarly, the structural assembly 16 can be aged in the die cavity 28, for example, after the structural assembly 16 has been formed or formed and quenched in the die cavity 28. FIG. 10A illustrates an aging profile for aluminum alloys according to one embodiment of the present invention, indicating the pressure and temperature variation within the die cavity 28 during the aging processes. As illustrated, the temperature of the structural assembly 16 in the die cavity 28 and the pressure in the die cavity 28 begin at initial conditions, which can be ambient conditions. The temperature in the die cavity 28 is increased in a 15 minute time period to 350° F. by energizing the induction coils 50 and thereby heating the susceptor 70 and, thus, the structural assembly 16. The pressure in the die cavity 28 is increased to 300 psi by injecting gas through the injector 80, thereby maintaining the structural assembly 16 against the forming surface 24 of the forming apparatus 10. A nine-hour aging process is illustrated at a temperature of 350° F. and 300 psi, but other durations, temperatures, and pressures can also be used. Also, the initial temperature and pressure can be higher than ambient conditions, for example, if the die cavity 28 is not cooled or depressurized to ambient conditions after forming and/or quenching or cooling. Thus, the structural assembly 16 can be aged after the forming process, with or without an intervening quenching process. For structural assemblies 16 formed of aluminum or aluminum alloys, it may be preferable to age the structural assembly 16 only after quenching or otherwise cooling the structural assembly 16 at a controlled rate. Alternatively, for other materials, such as some aluminum-lithium alloys, no quenching cycle may be necessary between the forming and aging processes.

Figure 11:
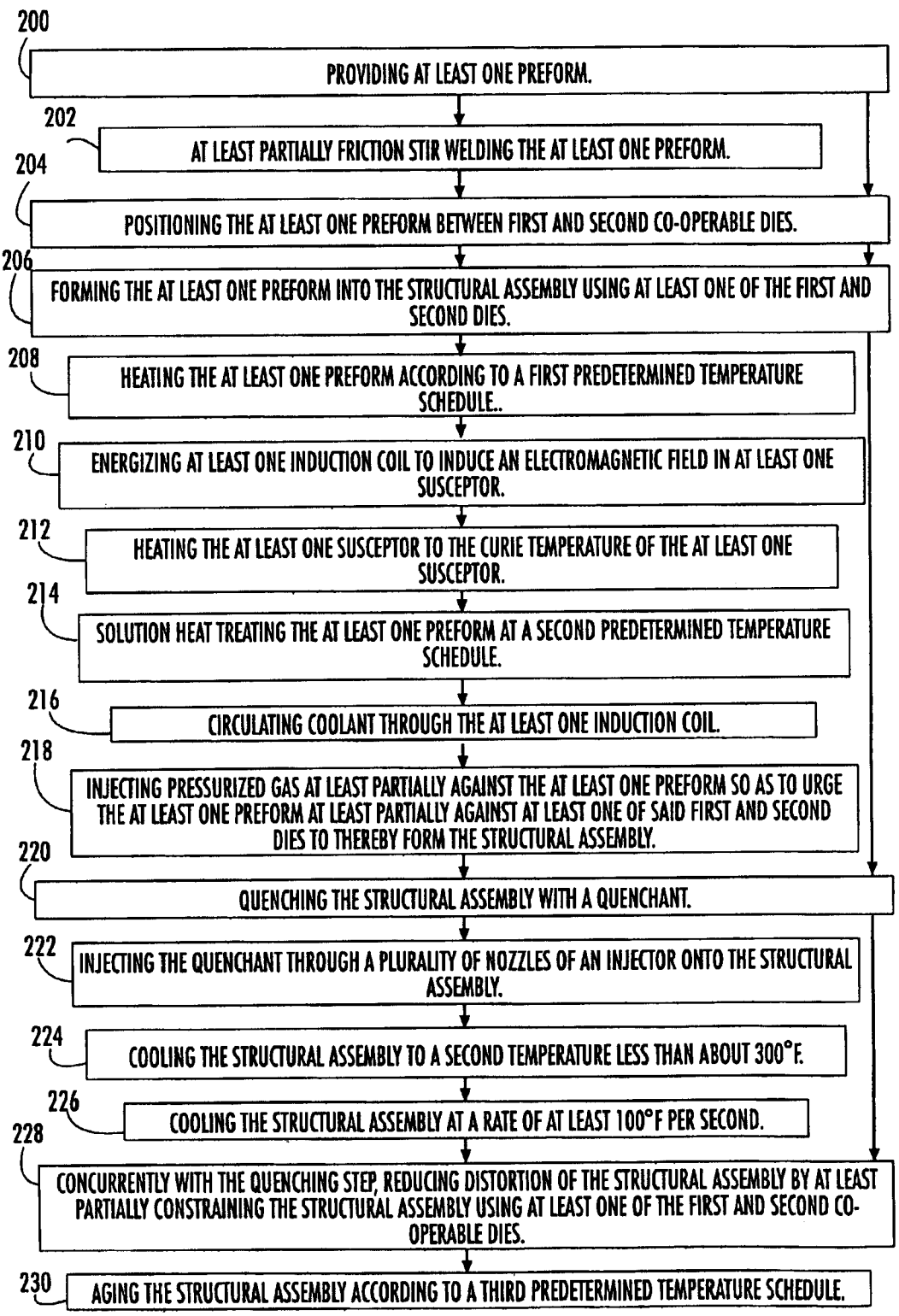
FIG. 11 is a flow chart illustrating the operations performed in manufacturing a structural assembly according to one embodiment of the present invention.

Referring to FIG. 11, there are illustrated the operations performed in manufacturing a structural assembly according to one embodiment of the present invention. The method includes providing at least one preform. See Block 200. According to one embodiment, the at least one preform is at least partially friction stir welded. See Block 202. The at least one preform is positioned between first and second co-operable dies. See Block 204. Next, the at least one preform is formed into the structural assembly using at least one of the first and second dies. See Block 206. According to one embodiment, the at least one preform is heated according to a first predetermined temperature schedule. See Block 208. Heating can include energizing at least one induction coil to induce an electromagnetic field in at least one susceptor. See Block 210. The at least one susceptor can be heated to the Curie temperature of the susceptor. See Block 212. According to one embodiment, the at least one preform is solution heat treated at a second predetermined temperature schedule. See Block 214. According to another embodiment, coolant is circulated through the at least one induction coil. See Block 216. Pressurized gas can also be injected at least partially against the at least one preform so as to urge the at least one preform at least partially against at least one of said first and second dies to thereby form the structural assembly. See Block 218. The method also includes quenching the structural assembly with a quenchant. See Block 220. The quenchant can be injected through a plurality of nozzles of an injector onto the structural assembly. See Block 222. In one embodiment, quenching cools the structural assembly to a second temperature less than about 300° F. See Block 224. In another embodiment, quenching cools the structural assembly at a rate of at least 100° F. per second. See Block 226. Concurrently with the quenching step, distortion of the structural assembly is reduced by at least partially constraining the structural assembly using at least one of the first and second co-operable dies. See Block 228. The structural assembly can also be aged according to a third predetermined temperature schedule. See Block 230.

Figure 12:
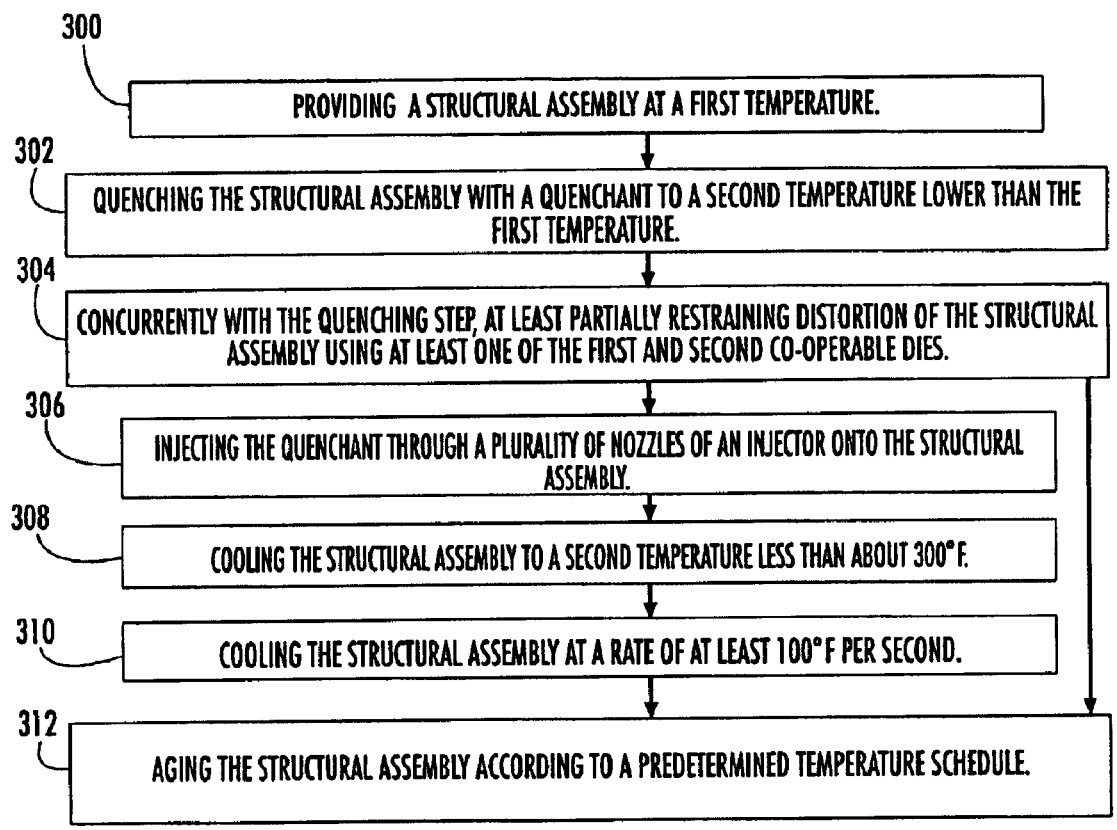
FIG. 12 is a flow chart illustrating the operations performed in manufacturing a structural assembly according to another embodiment of the present invention.

Referring now to FIG. 12, there are illustrated the operations performed in manufacturing a structural assembly according to another embodiment of the present invention. The method includes providing a structural assembly at a first temperature. See Block 300. The structural assembly is quenched with a quenchant to a second temperature lower than the first temperature. See Block 302. The quenchant can be injected through a plurality of nozzles of an injector onto the structural assembly. See Block 304. In one embodiment of the invention, the structural assembly is cooled to a second temperature less than about 300° F. See Block 306. In another embodiment, the structural assembly is cooled at a rate of at least 100° F. per second. See Block 308. Concurrently with the quenching step, distortion of the structural assembly is at least partially restrained using at least one of first and second co-operable dies. See Block 310. The structural assembly can also be aged according to a predetermined temperature schedule. See Block 312.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of manufacturing a structural assembly, comprising:

providing at least one preform;

positioning the at least one preform between first and second co-operable dies;

injecting pressurized gas at least partially against the at least one preform so as to urge the at least one preform at least partially against at least one of said first and second dies and thereby forming the at least one preform into the structural assembly using at least one of the first and second dies;

quenching the structural assembly with a quenchant; and concurrently with said quenching step, reducing distortion of the structural assembly by at least partially constraining the structural assembly using at least one of the first and second co-operable dies.

2. A method according to claim 1 wherein said providing step comprises at least partially friction stir welding the at least one preform.

3. A method according to claim 1 wherein said forming step comprises:

heating the at least one preform according to a first predetermined temperature schedule.

4. A method according to claim 3 wherein said heating step comprises energizing at least one induction coil to induce an electromagnetic field in at least one susceptor.

5. A method according to claim 4 wherein said heating step comprises heating the at least one susceptor to the Curie temperature of the at least one susceptor.

6. A method according to claim 4 further comprising circulating coolant through the at least one induction coil.

7. A method according to claim 3 wherein said heating step comprises solution heat treating the at least one preform at a second predetermined temperature schedule prior to said injecting step.

8. A method according to claim 1 wherein said quenching step comprises injecting the quenchant through a plurality of nozzles of an injector onto the structural assembly.

9. A method according to claim 1 wherein said quenching step comprises cooling the structural assembly to a second temperature less than about 300° F.

10. A method according to claim 1 wherein said quenching step comprises cooling the structural assembly at a rate of at least 100° F. per second.

11. A method according to claim 1 further comprising aging the structural assembly according to a third predetermined temperature schedule, said aging step comprising heating the structural assembly before removing the structural assembly from within the dies.

12. A product obtained by the method of claim 1.

13. A product according to claim 12 wherein the preform is formed of at least one of the group consisting of aluminum and aluminum alloys.

* * * * *